(12) United States Patent
Oh et al.

(10) Patent No.: US 9,118,418 B2
(45) Date of Patent: Aug. 25, 2015

(54) HIGH SPEED DATA SERIAL CONNECTION INTERFACE APPARATUS, CPRI TRANSMITTING AND RECEIVING METHOD

(71) Applicant: Electronics and Telecommunications Research Institute, Daejeon (KR)

(72) Inventors: Jung Yeol Oh, Daejeon (KR); Dae Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 129 days.

(21) Appl. No.: 14/054,310

(22) Filed: Oct. 15, 2013

(65) Prior Publication Data

US 2014/0169798 A1      Jun. 19, 2014

(30) Foreign Application Priority Data

Dec. 17, 2012   (KR) .......................... 10-2012-0147538

(51) Int. Cl.
*H04B 10/00* (2013.01)
*H04B 10/2575* (2013.01)

(52) U.S. Cl.
CPC ................................ *H04B 10/25758* (2013.01)

(58) Field of Classification Search
CPC .................. H04B 10/25753; H04B 10/25758; H04B 10/25759
See application file for complete search history.

(56) References Cited

U.S. PATENT DOCUMENTS

| 7,656,897 | B2 * | 2/2010 | Liu | 370/467 |
| 7,680,149 | B2 * | 3/2010 | Liu et al. | 370/466 |
| 2009/0245228 | A1 * | 10/2009 | Osterling | 370/350 |
| 2010/0246487 | A1 * | 9/2010 | Aoyama et al. | 370/328 |
| 2011/0135013 | A1 | 6/2011 | Wegener | |
| 2011/0281593 | A1 * | 11/2011 | Chard et al. | 455/461 |
| 2013/0208671 | A1 * | 8/2013 | Royz et al. | 370/329 |
| 2014/0023048 | A1 * | 1/2014 | Vu et al. | 370/336 |

FOREIGN PATENT DOCUMENTS

KR    10-2010-0117813    11/2010

* cited by examiner

*Primary Examiner* — Dzung Tran
(74) *Attorney, Agent, or Firm* — Nelson Mullins Riley & Scarborough LLP

(57) ABSTRACT

A high speed data serial connection interface apparatus, CPRI transmitting and receiving methods thereof are disclosed. A high speed data serial connection interface apparatus according to the present invention includes: a data transmitter configured to count a continuous NCB of 0 or 1 in an input data block, select an LSI value, and perform up scaling on data in the block in accordance with the selected LSI value to transmit the data through an optical fiber in accordance with a CPRI (common public radio interface) protocol; and a data receiver configured to receive the data transmitted by the data transmitter, restore the LSI value from the received data, and perform down scaling on the received data in accordance with the restored LSI value to restore original data.

11 Claims, 9 Drawing Sheets

FIG. 5

|     | 0 | 1 |   |   |   |   |   |   |   |   |   |   |   |   | 15 |    |
|-----|---|---|---|---|---|---|---|---|---|---|---|---|---|---|----|----|
| MSB | 0 | 1 | 0 | 1 | 0 | 0 | 0 | 1 | 1 | 1 | 0 | 1 | 0 | 1 | 0 | 0 | 0 |
|     | 0 | 1 | 0 | 1 | 0 | 0 | 0 | 1 | 1 | 1 | 0 | 1 | 0 | 1 | 0 | 0 | 1 |
| LSI | 0 | 1 | 0 | 1 | 0 | 0 | 0 | 1 | 1 | 1 | 0 | 1 | 0 | 1 | 0 | 0 |   |
|     | 0 | 1 | 0 | 1 | 0 | 0 | 0 | 1 | 1 | 1 | 0 | 1 | 0 | 1 | 0 | 0 |   |
|     | 0 | 0 | 1 | 0 | 0 | 0 | 0 | 0 | 0 | 0 | 0 | 0 | 0 | 0 | 0 | 0 |   |
|     | 1 | 0 | 0 | 0 | 0 | 1 | 1 | 0 | 0 | 0 | 0 | 0 | 0 | 0 | 0 | 0 |   |
| NCB | 1 | 0 | 0 | 0 | 1 | 0 | 1 | 0 | 1 | 0 | 1 | 0 | 0 | 0 | 1 | 0 |   |
|     | 0 | 0 | 1 | 0 | 0 | 1 | 0 | 0 | 0 | 1 | 0 | 1 | 0 | 0 | 0 | 0 |   |
|     | 0 | 0 | 1 | 0 | 0 | 1 | 1 | 0 | 1 | 0 | 0 | 0 | 0 | 1 | 0 | 0 |   |
|     | 1 | 0 | 1 | 1 | 0 | 0 | 0 | 0 | 0 | 1 | 0 | 0 | 0 | 0 | 0 | 1 | 18 |
|     | 0 | 0 | 0 | 0 | 1 | 0 | 1 | 0 | 0 | 1 | 1 | 0 | 0 | 0 | 0 | 0 |   |
|     | 0 | 0 | 0 | 1 | 0 | 0 | 0 | 1 | 1 | 1 | 0 | 1 | 0 | 1 | 1 | 1 |   |
|     | 0 | 0 | 1 | 0 | 1 | 1 | 1 | 1 | 0 | 0 | 0 | 1 | 0 | 1 | 0 | 1 |   |
|     | 1 | 0 | 0 | 1 | 1 | 0 | 0 | 0 | 0 | 1 | 0 | 0 | 0 | 1 | 0 | 0 |   |
|     | 0 | 0 | 0 | 0 | 0 | 0 | 0 | 1 | 1 | 1 | 0 | 1 | 0 | 1 | 0 | 14 |   |
|     | 0 | 0 | 0 | 1 | 0 | 1 | 1 | 0 | 1 | 0 | 0 | 0 | 0 | 1 | 1 | 1 |   |
|     | 0 | 1 | 0 | 1 | 1 | 0 | 1 | 1 | 0 | 1 | 0 | 1 | 1 | 0 | 0 | 1 |   |
| LSB | 1 | 1 | 0 | 0 | 0 | 1 | 0 | 1 | 0 | 0 | 0 | 0 | 1 | 0 | 1 | 0 | 17 |

FIG. 6

|     | 0 | 1 | 2 | 3 | 4 | 5 | 6 | 7 | 8 | 9 | 10 | 11 | 12 | 13 | 14 |    |
|-----|---|---|---|---|---|---|---|---|---|---|----|----|----|----|----|----|
| MSB | 0 | 1 | 0 | 1 | 0 | 0 | 0 | 1 | 1 | 1 | 0  | 1  | 0  | 1  | 0  | 0  |
|     | 0 | 0 | 1 | 0 | 0 | 0 | 0 | 0 | 0 | 0 | 0  | 0  | 0  | 0  | 0  | 1  |
|     | 1 | 0 | 0 | 0 | 0 | 1 | 1 | 0 | 0 | 0 | 0  | 0  | 0  | 0  | 0  |    |
|     | 1 | 0 | 0 | 0 | 1 | 0 | 1 | 0 | 1 | 0 | 1  | 0  | 0  | 0  | 1  | 0  |
|     | 0 | 0 | 1 | 0 | 0 | 1 | 0 | 0 | 0 | 1 | 0  | 1  | 0  | 0  | 0  | 0  |
|     | 0 | 0 | 1 | 0 | 0 | 1 | 1 | 0 | 1 | 0 | 0  | 0  | 0  | 1  | 0  | 0  |
|     | 1 | 0 | 1 | 1 | 0 | 0 | 0 | 0 | 0 | 0 | 1  | 0  | 0  | 0  | 0  | 1  |
|     | 0 | 0 | 0 | 0 | 1 | 0 | 1 | 0 | 0 | 0 | 1  | 1  | 0  | 0  | 0  | 0  |
|     | 0 | 0 | 0 | 1 | 0 | 0 | 0 | 1 | 1 | 1 | 0  | 1  | 0  | 1  | 1  | 1  |
|     | 0 | 0 | 1 | 0 | 1 | 1 | 1 | 1 | 0 | 0 | 0  | 1  | 0  | 1  | 0  | 1  |
|     | 1 | 0 | 0 | 1 | 1 | 0 | 0 | 0 | 0 | 1 | 0  | 0  | 0  | 1  | 0  | 0  |
|     | 0 | 0 | 0 | 0 | 0 | 0 | 0 | 0 | 1 | 1 | 1  | 0  | 1  | 0  | 1  | 0  |
|     | 0 | 0 | 0 | 1 | 0 | 1 | 1 | 0 | 1 | 0 | 0  | 0  | 0  | 1  | 1  | 1  |
|     | 0 | 1 | 0 | 1 | 1 | 0 | 1 | 1 | 0 | 1 | 0  | 1  | 1  | 0  | 0  | 1  |
| LSB | 1 | 1 | 0 | 0 | 0 | 1 | 0 | 1 | 0 | 0 | 0  | 0  | 1  | 0  | 1  | 0  | 14 |

| X | X | X | X | X | X | X | X | X | X | X | X | X | X | 1 | 1 |
|---|---|---|---|---|---|---|---|---|---|---|---|---|---|---|---|
|   |   |   |   |   |   |   |   |   |   |   |   |   |   | LSI |  |

FIG. 7

|     | 0 | 1 |   |   |   |   |   |   |   |   |   |   |   |   | 15 |   |
|-----|---|---|---|---|---|---|---|---|---|---|---|---|---|---|---|---|
| MSB | 0 | 1 | 0 | 1 | 0 | 0 | 0 | 1 | 1 | 1 | 0 | 1 | 0 | 1 | 0 | 0 | 0
|     | 0 | 1 | 0 | 1 | 0 | 0 | 0 | 1 | 1 | 1 | 0 | 1 | 0 | 1 | 0 | 0 | 1
|     | 0 | 1 | 0 | 1 | 0 | 0 | 0 | 1 | 1 | 1 | 0 | 1 | 0 | 1 | 0 | 0 |
|     | 0 | 1 | 0 | 1 | 0 | 0 | 0 | 1 | 1 | 1 | 0 | 1 | 0 | 1 | 0 | 0 |
|     | 0 | 0 | 1 | 0 | 0 | 0 | 0 | 0 | 0 | 0 | 0 | 0 | 0 | 0 | 0 | 0 |
|     | 1 | 0 | 0 | 0 | 0 | 1 | 1 | 0 | 0 | 0 | 0 | 0 | 0 | 0 | 0 | 0 |
|     | 1 | 0 | 0 | 0 | 1 | 0 | 1 | 0 | 1 | 0 | 1 | 0 | 0 | 0 | 1 | 0 |
|     | 0 | 0 | 1 | 0 | 0 | 1 | 0 | 0 | 0 | 1 | 0 | 1 | 0 | 0 | 0 | 0 |
|     | 0 | 0 | 1 | 0 | 0 | 1 | 1 | 0 | 1 | 0 | 0 | 0 | 0 | 1 | 0 | 0 |
|     | 1 | 0 | 1 | 1 | 0 | 0 | 0 | 0 | 0 | 0 | 1 | 0 | 0 | 0 | 0 | 1 | 18
|     | 0 | 0 | 0 | 0 | 1 | 0 | 1 | 0 | 0 | 0 | 1 | 1 | 0 | 0 | 0 | 0 |
|     | 0 | 0 | 0 | 1 | 0 | 0 | 0 | 1 | 1 | 1 | 0 | 1 | 0 | 1 | 1 | 1 |
|     | 0 | 0 | 1 | 0 | 1 | 1 | 1 | 1 | 0 | 0 | 0 | 1 | 0 | 1 | 0 | 1 |
|     | 1 | 0 | 0 | 1 | 1 | 0 | 0 | 0 | 0 | 1 | 0 | 0 | 0 | 1 | 0 | 0 |
|     | 0 | 0 | 0 | 0 | 0 | 0 | 0 | 0 | 1 | 1 | 1 | 0 | 1 | 0 | 1 | 0 | 14
|     | 0 | 0 | 0 | 1 | 0 | 1 | 1 | 0 | 1 | 0 | 0 | 0 | 0 | 1 | 1 | 1 |
|     | 0 | 1 | 0 | 1 | 1 | 0 | 1 | 1 | 0 | 1 | 0 | 1 | 1 | 0 | 0 | 1 |
| LSB | 1 | 1 | 0 | 0 | 0 | 1 | 0 | 1 | 0 | 0 | 0 | 0 | 1 | 0 | 1 | 0 | 17

HIGH SPEED DATA SERIAL CONNECTION INTERFACE APPARATUS, CPRI TRANSMITTING AND RECEIVING METHOD

CROSS-REFERENCE TO RELATED APPLICATIONS

This application claims priority to and the benefit of Korean Patent Application No. 10-2012-0147538 filed in the Korean Intellectual Property Office on Dec. 17, 2012, the entire contents of which are incorporated herein by reference.

TECHNICAL FIELD

The present invention relates to a high speed data serial connection interface apparatus, CPRI transmitting and receiving methods and more specifically, to a high speed data serial connection interface apparatus which serially connects and interfaces high speed data between a base band model of a mobile communication system and an RF (radio frequency) wireless transceiver, and CPRI transmitting and receiving methods thereof.

BACKGROUND ART

A next generation mobile communication system is developing so as to efficiently provide a high quality multimedia and various future technical services and to improve a transmission capacity through an efficient wireless transmitting technology.

Recently, the mobile communication system develops so as to have a structure in that an RF (radio frequency) transceiver having multiple antennas and a power amplifier are separated from a baseband modem and one or multiple RF units are located in remote site to increase a transmission efficiency and apply various wireless transmission technology.

Nevertheless, a bit resolution that the mobile communication systems use is not a problem in a current LTE standard, it may act as a problem in the future mobile communication technology which demands higher modulation efficiency. This is because a cell radius in a future mobile communication structure such as a Femto base station is getting smaller and transmission rates are getting higher as the cell radius get smaller. In order to support the modulation method having a high modulation factor, higher bit resolution of the base band signal is required.

A related art of the present invention is disclosed in Korean Patent Application Unexamined Publication No. 10-2011-0030474 (titled as compression of baseband signals in base transceiver system, published on Mar. 23, 2011). Korean Patent Application Unexamined Publication No. 10-2011-0030474 uses a digital data compression technology, but the present invention uses a data scaling technology to very simply process a digital signal.

SUMMARY OF THE INVENTION

The present invention has been made in an effort to provide a high speed data serial connection interface apparatus which scales data in a block unit which is the same as a basic frame size of the CPRI standard of the related art to support high bit resolution with the same bit transmission for a future mobile communication standard which supports a higher modulation factor, and CPRI transmitting and receiving methods thereof, as compared with the related art which transmits an I/Q data resolution of a LTE modulation signal at 15 bits in the CPRI standard of the related art.

A high speed data serial connection interface apparatus according to an exemplary embodiment of the present invention may include a data transmitter configured to count the number of the first continuous bits of 0 or 1 in a real part and an imaginary part in an input data block, select a smallest scaling value, and perform up scaling on data in the block in accordance with the selected scaling value to transmit the data through an optical fiber in accordance with a CPRI (common public radio interface) protocol; and a data receiver configured to receive the data transmitted by the data transmitter, restore a scaling index from the received data, and perform down scaling on the received data in accordance with the restored scaling value to restore original data.

The data transmitter may include an NCB counter configured to count an NCB (number of continuous bits) which is the number of the first continuous bits of 0 or 1 in the real part or the real and imaginary part in the input data block, an LSI selector configured to select a LSI (least scaling index) which is the smallest one among the NCB data calculated by the NCB counter; an up scaling unit configured to perform up scaling by shifting all data in the input data block to the left by the selected LSI and then limit the data into a bit supported by the CPRI; and a CPRI transmitter configured to fill the input data with a data area of a basic frame for every block and insert the selected LSI value into a control word of a control management area and then transmit the data through the optical fiber in accordance with the CPRI protocol.

The high speed data serial connection interface apparatus may further include a first block buffer configured to sequentially store the real part and the imaginary part for the input data block.

When the first data of the block is input, the LSI selector may set an LSI initial value to a maximum value and then compares a value of NCB input from the NCB counter with the LSI initial value to update the LSI with a smaller value and repeat the processes for one block section to select the smallest NCB value as the LSI value.

The data receiver may include a CPRI receiver configured to receive data from the data transmitter and restore data in the basic frame and the LSI which is transmitted to the control management area in the received data and a down scaling unit configured to receive the LSI restored by the CPRI receiver and shift the data in the corresponding block to the right by a restored LSI, and restore original data at a final output terminal.

The data receiver may further include a second block buffer configured to restore real part data or the real and imaginary part data which is output from the down scaling unit into the original bit resolution to output the data.

As an CPRI transmitting method according to another exemplary embodiment, an CPRI transmitting method of a high speed data serial connection interface apparatus may include counting the number of the first continuous bits of 0 or 1 in a real part and an imaginary part in an input data block, selecting an LSI which is the smallest one among the NCBs calculated in the counting, performing up scaling on data by shifting all data in the input data block to the left by the selected LSI; and filling the input data with a data area of a basic frame for every block and inserting the selected LSI value into a control word of a control management area and then transmitting the data through the optical fiber in accordance with the CPRI protocol.

The CPRI transmitting method may further include sequentially storing a real part or a real and an imaginary part of the input data block. In this case, the counting counts a bit number of 0 or 1 which is continuous and same as a code bit in the real part or the real and imaginary part in one block which is sequentially stored in the storing.

The selecting of an LSI may set a value of the LSI when a first data of the block is input as an available maximum value and then compares the value with the value of the NCB input from the counting of an NCB to update the LSI with a smaller value and repeats the above process during one block section to select the NCB with the LSI value.

In a CPRI receiving method according to an exemplary embodiment of the present invention, a CPRI receiving method of a high speed data serial connection interface apparatus, may include receiving data from a data transmitter and restoring data in a basic frame and an LSI which is transmitted to a control and management area from the received data; and receiving the LSI restored in the restoring, shifting the data in a corresponding block to the right by the input LSI value, and restoring original data at a final output terminal.

The CPRI receiving method may further include restoring the real part and imaginary part data with an original bit resolution from the restoring of the original data at the final output terminal to output the data.

According to the present invention, a high speed digital serial connection interface apparatus for a future mobile communication physical layer standard which supports a higher modulation factor, CPRI transmitting and receiving methods thereof is provided to provide a data interface with a higher bit resolution by performing a simple digital signal processing on an existing interface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 is a view illustrating an example of NCB count and LSI extraction.

FIG. 6 is a view illustrating 15 bit processed data by the exemplary embodiment of FIG. 5 and an LSI data storing example.

FIG. 7 is a view illustrating an example of data which is restored in a data received and received in a block buffer.

Figure 1:
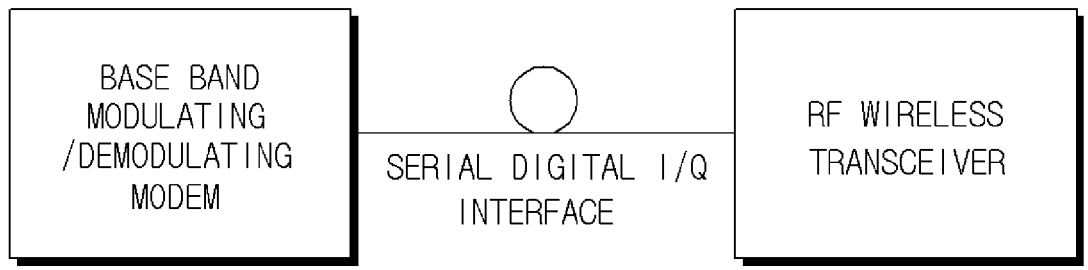
FIG. 1 is a view schematically illustrating an interface structure of a base band modem and a remote RF module of a base station.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a high speed data serial connection interface apparatus, and CPRI transmitting and receiving methods according to an exemplary embodiment of the present invention will be described in detail with reference to accompanying drawings.

As one of methods which implement a remote RF unit, as illustrated in FIG. 1, a high speed digital serial interface which uses an optical fiber is used between a base band and an RF in some cases.

Figure 2:
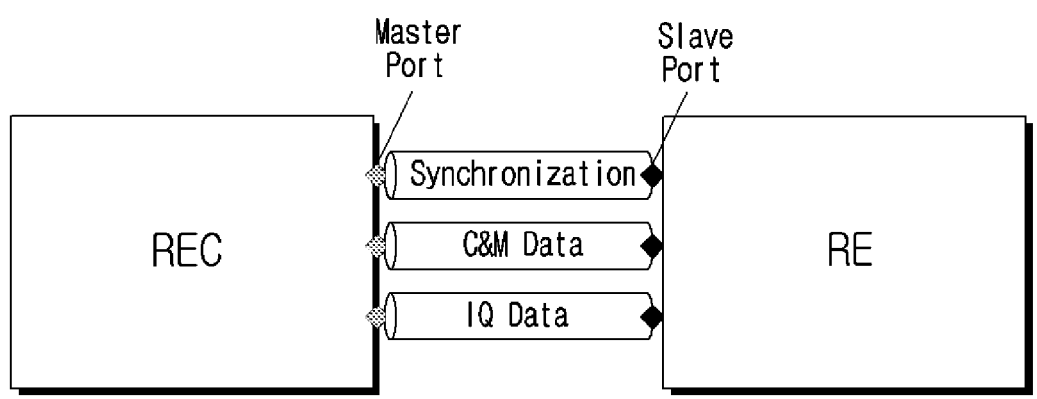
FIG. 2 is a view illustrating a CPRI connection structure.

For the high speed digital serial connection, a CPRI (common public radio interface) standard is comprehensively used. The CPRI connection is illustrated in FIG. 2.

The base band modem is connected to an RRH (remote radio head) through the optical fiber using a CPRI connection technology. According to the CPRI standard, the base band modem unit of the base station is operated by an REC (radio equipment controller) and the RRH (remote radio head) is operated by an RE (radio equipment). Here, a CPRI protocol is largely configured by three channels, for example, a synchronization channel, a control and management channel, and a data transmission channel.

A fiber transmission rate which is supported in the CPRI V4.1 standard is as follows.
CPRI line bit rate option 1: 614.4 Mbit/s
CPRI line bit rate option 2: 1228.8 Mbit/s (2×614.4 Mbit/s)
CPRI line bit rate option 3: 2457.6 Mbit/s (4×614.4 Mbit/s)
CPRI line bit rate option 4: 3072.0 Mbit/s (5×614.4 Mbit/s)
CPRI line bit rate option 5: 4915.2 Mbit/s (8×614.4 Mbit/s)
CPRI line bit rate option 6: 6144.0 Mbit/s (10×614.4 Mbit/s)

A basic transmission rate may be calculated as follows.

$$614.4 \text{ Mbps} = 16 \text{ Word} \times 10 \text{ bits} \times 3.84 \text{ MHz}$$

Figure 3:
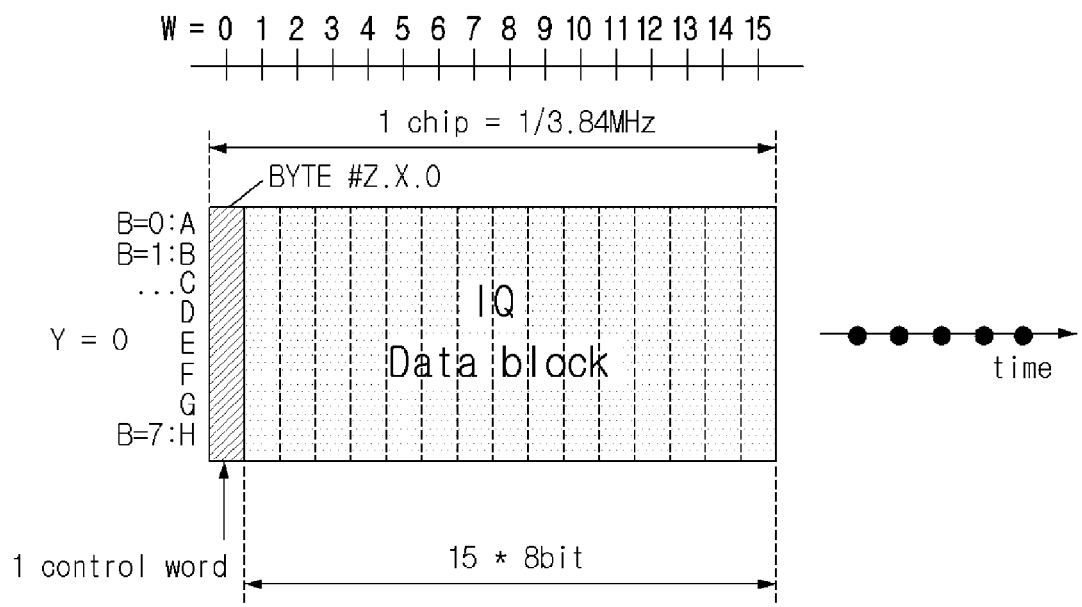
FIG. 3 is a view illustration a CPRI basic frame structure.

FIG. 3 is a view illustrating a CPRI basic frame structure.

As illustrated in FIG. 3, a basic frame which is the most fundamental unit of the CPRI has a chip rate of 3.84 MHz and includes 16 words (one word is eight bits). In this case, eight bits of one word is eight bits to ten bits coded to be converted into ten bits. When the basic frame is the fundamental unit, in the case of CPRI line bit rate option 2, an ORF (oversampling rate factor) is increased to be twice a basic transmission rate, in the case of option 3, the ORF is increased to be four times, and in the case of option 5, the ORF is increased to be eight times.

16 words of the basic frame are configured by 15 user IQ data words and one control word. Here, the control word is used to control and manage a CPRI link.

In the case of LTE (long term evolution) 4G (fourth generation) mobile communication system as an exemplary embodiment, a high speed data interface system for four multiple antenna connection whose sampling rate is 30.73 Msps and baseband I/Q data bit number is 16 bits is considered in order to configure a mobile communication channel having a bandwidth of 20 MHz. In this case, the total required bit rate is as follows:

$$3932.2 \text{ Mbps} = 30.72 \text{ MHz} \times 32 \text{ bits (I/Q)} \times 4 \text{ Ant.}$$

Here, even though it is considered that 3932.2 Mbps can be transmitted in accordance with 4915.2 Mbps standard of the CPRI option 5, 3932.2 Mbps is not actually transmitted. This is because a user data transmission rate which is supported in Option 5 supports 3686.4 Mbps as follows.

3686.4 Mbps=15 Word×8 bits×3.84 MHz×8 (Oversampling Rate Factor)

This problem may be solved by limiting the I/Q sample bit number to 15 bits. By doing this, a required final throughput matches the user data transmission rate which is supported in the CPRI option 5.

3686.4 Mbps=30.72 MHz×30 bits (I/Q)×4 Ant.

As described above, the baseband model maintains the interface between RRHs at 15 bits for each I/Q and thus the data is transmitted to the transmission channel without having a gap.

Figure 4:
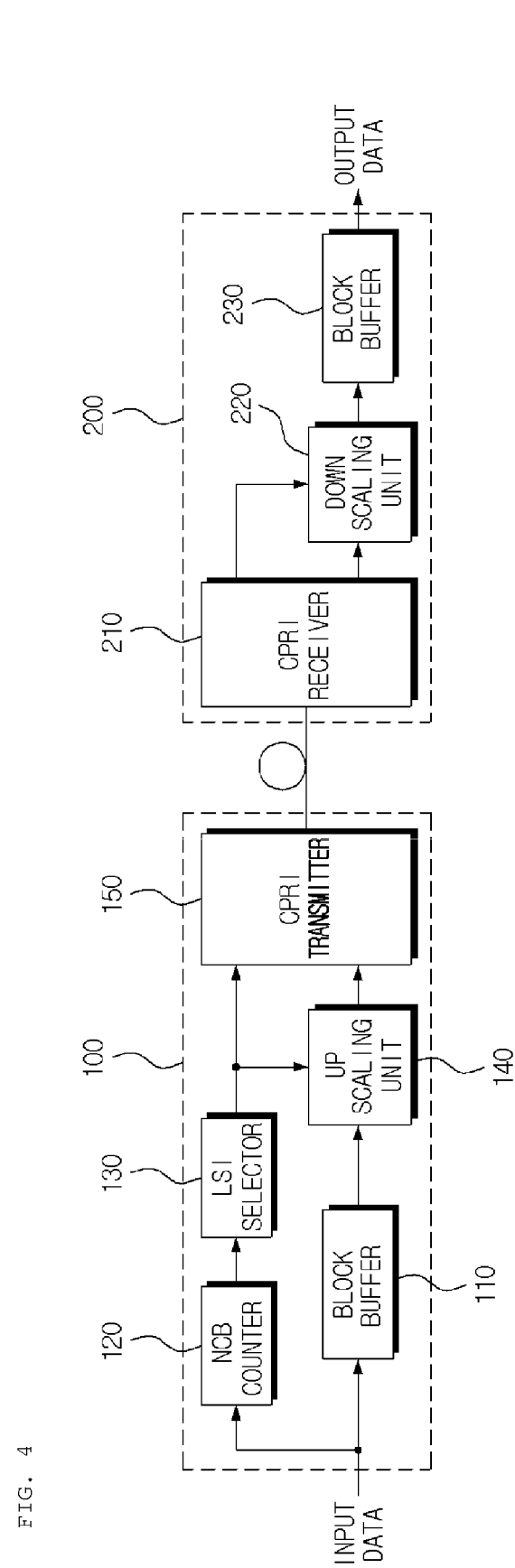
FIG. 4 is a view schematically illustrating a configuration of a high speed data serial connection interface apparatus according to an exemplary embodiment of the present invention.

FIG. 4 is a view schematically illustrating a configuration of a high speed data serial connection interface apparatus according to an exemplary embodiment of the present invention.

Referring to FIG. 4, the high speed data serial connection interface apparatus according to the exemplary embodiment of the present invention includes a data transmitter 100 and a data receiver 200.

The data transmitter 100 counts the number of the first continuous bits of 0 or 1 in a real part or a real and an imaginary part in an input data block, selects a smallest scaling value, and performs up scaling on data in the block in accordance with the selected scaling value to transmit the data through an optical fiber in accordance with a CPRI (common public radio interface) protocol.

To this end, the data transmitter 100 may include a block buffer 110, an NCB (number of continuous bits) counter 120, an LSI (least scaling index) selector 130, an up scaling unit 140, and a CPRI transmitting unit 150.

The block buffer 110 sequentially and temporally stores the real part or the real and imaginary part of the input data block in a block buffer memory.

The NCB counter 120 counts an NCB (number of continuous bits) of 0 or 1 which is the same as a code bit and continuous in the real part or the real and imaginary part in one block.

The LSI selector 130 selects the LSI which is the smallest NCB value among the NCBs calculated by the NCB counter 120. In this case, the LSI selector 130 sets the LSI to the maximum value when the first data of the block is input and then compares the LSI with the NCB value input from the NCB counter 120 to update the LSI with a smaller value and repeats the process during one block section to select the smallest NCB value as the LSI value.

The up scaling unit 140 performs up scaling by shifting all data in the input data block to the left by the selected LSI and then limits the data into a bit supported by the CPRI.

The CPRI transmitter 150 fills the input data with a data area of a basic frame for every block and inserts the selected LSI value into a control word of a control management area and then transmits the data through the optical fiber in accordance with the CPRI protocol.

The data receiver 200 receives the data transmitted by the data transmitter 100, restores the LSI from the received control area data, and performs the down scaling on the received data in accordance with the restored LSI value to restore original data.

To this end, the data receiver 200 includes a CPRI receiving unit 210, a down scaling unit 220, and a block buffer 230.

The CPRI receiving unit 210 receivers data from the data transmitter 100 and restores the data in the basic frame and the LSI which is transmitted to the control management area in the received data.

The down scaling unit 220 receives the LSI which is restored by the CPRI receiving unit 210, shifts the data in the corresponding block to the right by the input LSI value and restores original data in the final output terminal.

The block buffer 230 restores the real part or the real and imaginary part data output from the down scaling unit 220 at an original bit resolution to output the data. Here, the size of the block buffer 230 may be same as the size of the block buffer 110 of the data transmitter 100. Further, the block buffer 230 may use a buffer memory which is in proportion to a size of the block frame of the CPRI standard.

In order to support 256-QAM symbol at 2048 point FFT which is currently adopted in the LTE standard, a resolution of approximately 18 bit is required for each I/Q. The exemplary embodiment of the present invention suggests a method which achieves a performance of 18 bit resolution while maintaining the data interface at 15 bits.

FIG. 5 is a view illustrating an example of NCB count and LSI extraction.

FIG. 5 illustrates an example that cuts off 18 bit of input data for every sample with 15 bits to transmit the data according to the exemplary embodiment. An NCB is calculated from input data. The NCB is the number of continuous bits which is the same as a code bit of the input data during the block size section. The NCB of the first input data of FIG. 5 is 4 and second data is 3. As described above, a smallest NCB among the NCBs obtained during one block section is defined as an LSI. In this exemplary embodiment, the LSI is 3. In this case, a range of the data of the LSI is 1 to 2^B (B is LSI binary bit number). Immediately after completing an operation of each data block, data in the block memory is up scaled by the LSI.

FIG. 6 is a view illustrating 15 bit processed data by the exemplary embodiment of FIG. 5 and an example of LSI data storing.

As described in the exemplary embodiment of FIG. 5, if the LSI is 3, left bit shift is performed by the LSI value as illustrated in FIG. 6 to cut out the data as much as the LSI bits. After performing the bit shift, the data is cut out by 15 bits which are the final output bit. The finally processed data in the block is illustrated in FIG. 6. The data bit in one block is configured by the basic frame by the CPRI protocol and the LSI bit is allocated into a partial bit area of a control word of the CPRI control and management area. In this exemplary embodiment, the bit number B of the LSI is 2 and a binary number "11" is transmitted.

FIG. 7 illustrates data which is restored in the data receiver 200 and stored in the block buffer 230. A process of restoring data is developed by a reverse process of the data transmitter 100. The data receiver 200 extracts the LSI bit from the control word of the control and management area and performs the right shift on the 15 bit data to expand the code bit by the LSI value to restore original 18 bits.

Figure 8:
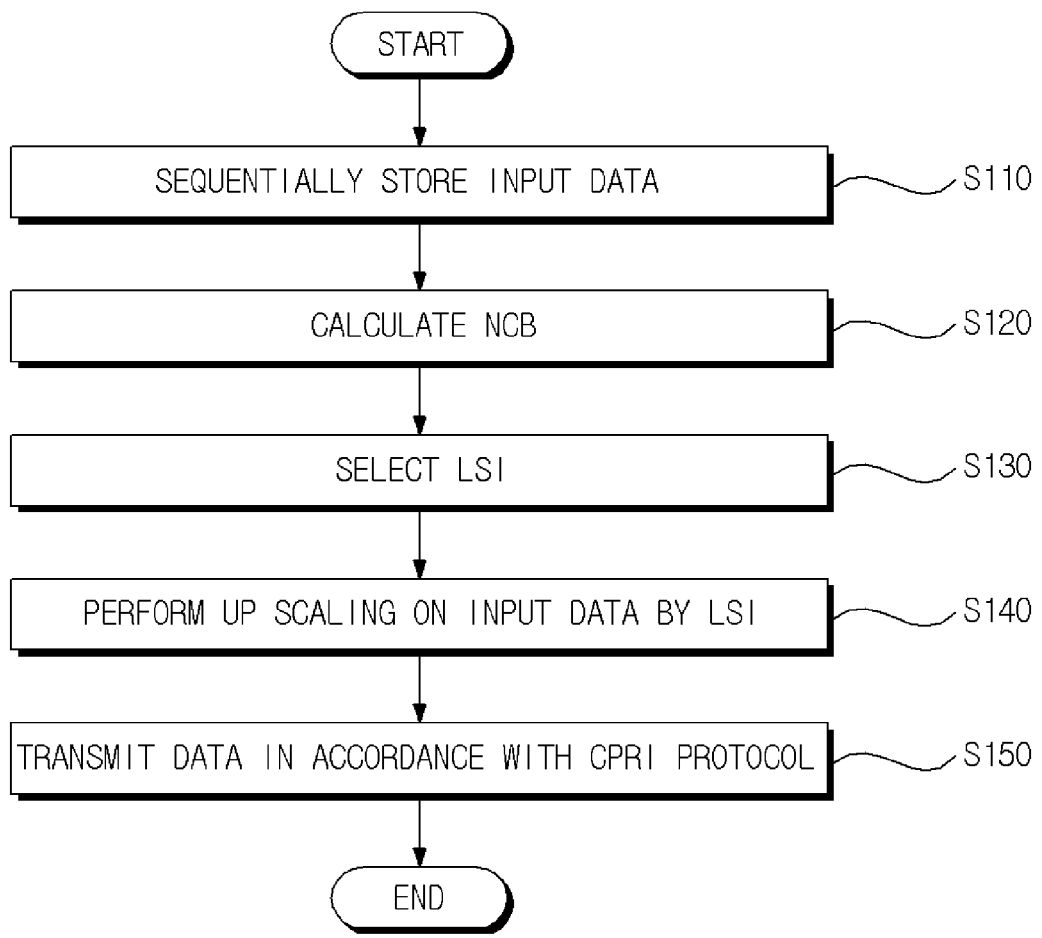
FIG. 8 is a flowchart illustrating a CPRI transmitting method according to an exemplary embodiment of the present invention.

FIG. 8 is a flowchart illustrating a CPRI transmitting method according to an exemplary embodiment of the present invention.

Referring to FIGS. 4 and 8, in step S110, the block buffer 110 sequentially and temporally stores the real part or the real and imaginary part of the input data block in a block buffer memory.

In step S120, the NCB counter 120 counts an NCB of 0 or 1 which is the same as a code bit and continuous in the real part or the real and imaginary part in one block.

In step S130, the LSI selector 130 selects the LSI which is the smallest one among the NCBs calculated by the NCB counter 120. In this case, the LSI selector 130 sets the LSI value to the maximum value when the first data of the block is input and then compares the LSI with the NCB value input from the NCB counter 120 to update the LSI with a smaller value and repeats the process during one block section to select the smallest NCB value as the LSI value.

In step S140, the up scaling unit 140 performs up scaling by shifting all data in the input data block to the left by the selected LSI and then limits the data into a bit supported by the CPRI.

In step S150, the CPRI transmitter 150 fills the input data with a data area of a basic frame for every block and inserts the selected LSI value into a control word of a control management area and then transmits the data through the optical fiber in accordance with the CPRI protocol.

Figure 9:
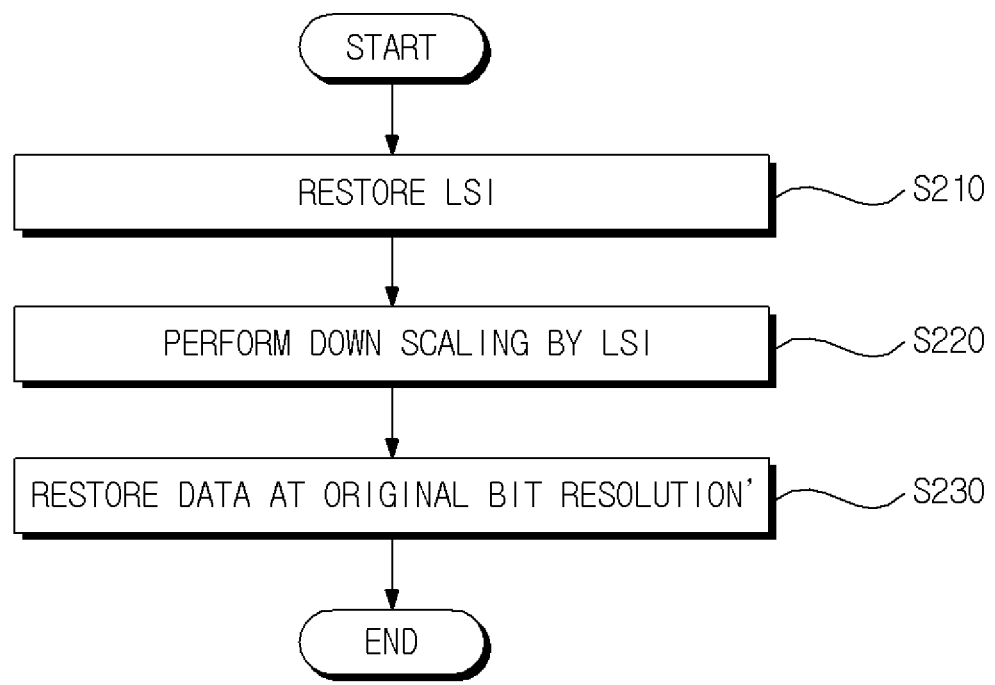
FIG. 9 is a flowchart illustrating a CPRI receiving method according to an exemplary embodiment of the present invention.

FIG. 9 is a flowchart illustrating a CPRI receiving method according to an exemplary embodiment of the present invention.

In step S210, the CPRI receiving unit 210 receives data from the data transmitter 100 and restores the data in the basic frame and the LSI which is transmitted to the control management area in the received data.

In step S220, the down scaling unit 220 receives the LSI which is restored by the CPRI receiving unit 210, shifts the data in the corresponding block to the right by the input LSI and restores original data in the final output terminal.

In step S230, the block buffer 230 restores the real part or the real and imaginary part data output from the down scaling unit 220 at an original bit resolution to output the data.

It will be appreciated that various exemplary embodiments of the present disclosure have been described herein for purposes of illustration, and that various modifications, changes, substitutions may be made by those skilled in the art without departing from the scope and spirit of the present disclosure. Accordingly, the various exemplary embodiments disclosed herein are not intended to limit the technical spirit but describe with the true scope and spirit being indicated by the following claims. The scope of the present invention may be interpreted by the appended claims and the technical spirit in the equivalent range are intended to be embraced by the invention.

What is claimed is:

1. A high speed data serial connection interface apparatus, comprising:
   a data transmitter configured to count an NCB (number of continuous bits) which is the number of the first continuous bits of 0 or 1 in an input data block, select an LSI (least scaling index) value which is the smallest one in the NCB values, and perform up scaling on data in the block in accordance with the selected LSI value to transmit the data through an optical fiber in accordance with a CPRI (common public radio interface) protocol; and
   a data receiver configured to receive the data transmitted by the data transmitter, restore the LSI value from the received control data, and perform down scaling on the received data in accordance with the restored LSI value to restore original data.

2. The high speed data serial connection interface apparatus of claim 1, wherein the data transmitter includes:
   an NCB (number of continuous bits) counter configured to count the NCB in the input data block;
   an LSI (least scaling index) selector configured to select the LSI value among the NCB calculated by the NCB counter;
   an up scaling unit configured to perform up scaling by shifting all data in the input data block to the left by the selected LSI value and then limit the data into a bit supported by the CPRI; and
   a CPRI transmitter configured to fill the input data with a data area of a basic frame for every block and insert the selected LSI value into a control word of a control management area and then transmit the data through the optical fiber in accordance with the CPRI protocol.

3. The high speed data serial connection interface apparatus of claim 2, further comprising:
   a first block buffer configured to sequentially store the input data blocks.

4. The high speed data serial connection interface apparatus of claim 2, wherein when the first data of the block is input, the LSI selector sets an LSI value to a maximum value and then compares a value of NCB input from the NCB counter with the LSI initial value to update the LSI value with a smaller value and repeats the processes for one block section to select the smallest NCB value as the LSI value.

5. The high speed data serial connection interface apparatus of claim 1, wherein the data receiver includes:
   a CPRI receiver configured to receive data from the data transmitter and restore data in the basic frame and the LSI value which is transmitted to the control management area, and
   a down scaling unit configured to receive the LSI value restored by the CPRI receiver and shift the data in the corresponding block to the right by a restored LSI value, and restore original data at a final output terminal.

6. The high speed data serial connection interface apparatus of claim 5, further comprising:
   a second block buffer configured to restore the data output from the down scaling unit to an original bit resolution and output the data.

7. An CPRI transmitting method of a high speed data serial connection interface apparatus, comprising:
   counting the number of the first continuous bits of 0 or 1 in an input data block;
   selecting an LSI value among NCBs calculated in the counting;
   performing up scaling on data by shifting all data in the input data block to the left by the selected LSI value; and
   filling the input data with a data area of a basic frame for every block and inserting the selected LSI value into a control word of a control management area and then transmitting the data through the optical fiber in accordance with the CPRI protocol.

8. The method of claim 7, further comprising:
   sequentially storing the input data blocks,
   wherein the counting counts the NCB of 0 or 1 which is the same as a code bit in one block which is sequentially stored by the storing and continuous.

9. The method of claim 7, wherein the selecting of the LSI value, when the first data of the block is input, sets an LSI value to a maximum value and then compares a value of NCB input from the counting with the LSI initial value to update the LSI value with a smaller value and repeats the processes for one block section to select the smallest NCB value as the LSI value.

10. A CPRI receiving method of a high speed data serial connection interface apparatus, comprising:
    receiving data from a data transmitter and restoring data in a basic frame and an LSI value which is transmitted to a control and management area from the received data; and receiving the restored LSI value, shifting the data in a corresponding block to the right by the input LSI value, and restoring original data at a final output terminal.

11. The method of claim 10, further comprising:
restoring the data at an original bit resolution from the storing of original data at the final output terminal to output the data.

* * * * *